United States Patent
Efstathiou et al.

(10) Patent No.: US 7,180,384 B2
(45) Date of Patent: Feb. 20, 2007

(54) UNIVERSAL SIGNAL MODULATORS

(75) Inventors: Dimitrios Efstathiou, Greensboro, NC (US); Ken Gentile, Bahama, NC (US)

(73) Assignee: Analog Devices, Inc., Norwood, MA (US)

(*) Notice: Subject to any disclaimer, the term of this patent is extended or adjusted under 35 U.S.C. 154(b) by 113 days.

(21) Appl. No.: 11/136,012

(22) Filed: May 23, 2005

(65) Prior Publication Data

US 2006/0261907 A1    Nov. 23, 2006

(51) Int. Cl.
    *H03K 7/00* (2006.01)
(52) U.S. Cl. ................ 332/106; 332/145; 375/299
(58) Field of Classification Search ............... 332/106, 332/145; 375/299
    See application file for complete search history.

(56) References Cited

U.S. PATENT DOCUMENTS

| | | | | |
|---|---|---|---|---|
| 5,301,367 A | | 4/1994 | Heinonen | 455/76 |
| 5,329,260 A | * | 7/1994 | Poplin | 332/119 |
| 5,737,253 A | | 4/1998 | Madisetti et al. | 364/721 |
| 5,784,413 A | | 7/1998 | Chen | 375/308 |
| 5,926,500 A | * | 7/1999 | Odenwalder | 375/144 |
| 6,002,923 A | * | 12/1999 | Sahlman | 455/118 |
| 6,653,896 B2 | | 11/2003 | Sevic et al. | 330/10 |
| 6,772,181 B1 | | 8/2004 | Fu et al. | 708/313 |
| 6,874,006 B1 | * | 3/2005 | Fu et al. | 708/442 |

OTHER PUBLICATIONS

Gentile, Ken, "DDS Simplifies Polar Modulation", EDN Magazine, Aug. 5, 2004, pp. 69-74.
McCune, E., et al., "Edge Transmitter Alternative Using Nonlinear Polar Modulation", Proceedings of the 2003 International Symposium on Circuits and Systems, ISCAS '03, May 2003, vol. 3, pp. III-594 to III-597.
Hajichristos, A., "Transmit Architectures and Power Control Schemes for—GSM/EDGE Applications", Proceedings of the 2003 International Symposium on Circuits and Systems, ISCAS '03,May 2003, vol. 3, pp. III-610 to III-613.
Torosyan, A., et al., "A 300-MHz Quadrature Direct Digtal Synthesizer/Mixer in 0.25 um CMOS", IEEE Journal of Solid-State Circuits, vol. 38, No. 6, Jun. 2003, pp. 875-887.

* cited by examiner

Primary Examiner—Robert Pascal
Assistant Examiner—Levi Gannon
(74) Attorney, Agent, or Firm—Koppel, Patrick & Heybl

(57) ABSTRACT

Universal signal modulators structures are shown which are particularly useful for selectively generating polar-modulated digital sequences from input phase and amplitude symbols and for generating quadrature-modulated digital sequences from input first and second quadrature symbols. Significantly, the modulation structure (quadrature modulation or polar modulation) of these embodiments can selected by simply changing the state of a mode command.

13 Claims, 7 Drawing Sheets

UNIVERSAL SIGNAL MODULATORS

BACKGROUND OF THE INVENTION

1. Field of the Invention

The present invention relates generally to digital signal modulators.

2. Description of the Related Art

Digital quadrature modulators generally connect first and second digital multipliers to a digital summer. A digital sine sequence that represents an analog sine signal typically drives one of the multipliers and a digital cosine sequence that represents an analog cosine signal drives the other multiplier. When the first and second multipliers respectively receive first and second digital input sequences (which may, for example, be symbols coded to represent bits of input data streams), the output of the summer is an output quadrature-modulated sequence that represents an analog signal which carries the first and second input sequences on carriers (sine and cosine) that have a quadrature relationship. This relationship can be altered to a different quadrature relationship by interchanging the sine and cosine sequences or by interchanging the first and second input sequences.

In a different modulator arrangement, the first input sequence and a selected one of the sine and cosine sequences can be applied to a summer to thereby alter the phase of the selected sequence. The phase-altered sequence and the second input sequence can then be subsequently applied to a multiplier to thereby generate a polar-modulated sequence that represents an analog signal which also carries the first and second input sequences in a quadrature relationship.

Although the modulations of quadrature modulators and polar modulators can be shown to be equivalent, one or the other may be more compatible with a particular system design. If that design changes, however, it may require the substitution of a different modulator structure.

BRIEF SUMMARY OF THE INVENTION

The present invention is directed to signal modulators having enhanced system compatibility. The novel features of the invention are set forth with particularity in the appended claims. The invention will be best understood from the following description when read in conjunction with the accompanying drawings.

DETAILED DESCRIPTION OF THE INVENTION

Universal signal modulator embodiments are described herein with reference to FIGS. 1A–1D, 2A–2C and 3. Although not shown in the figures, successive bits of input data streams are typically mapped in accordance with modulation constellations to generate the input symbols. Prior to the modulation processes shown, the symbols may be shaped with digital shaping filters to reduce intersymbol interference (ISI) and their sample rates are preferably altered through interpolation filters to match sample rates of the modulation processes.

Figure 1A:
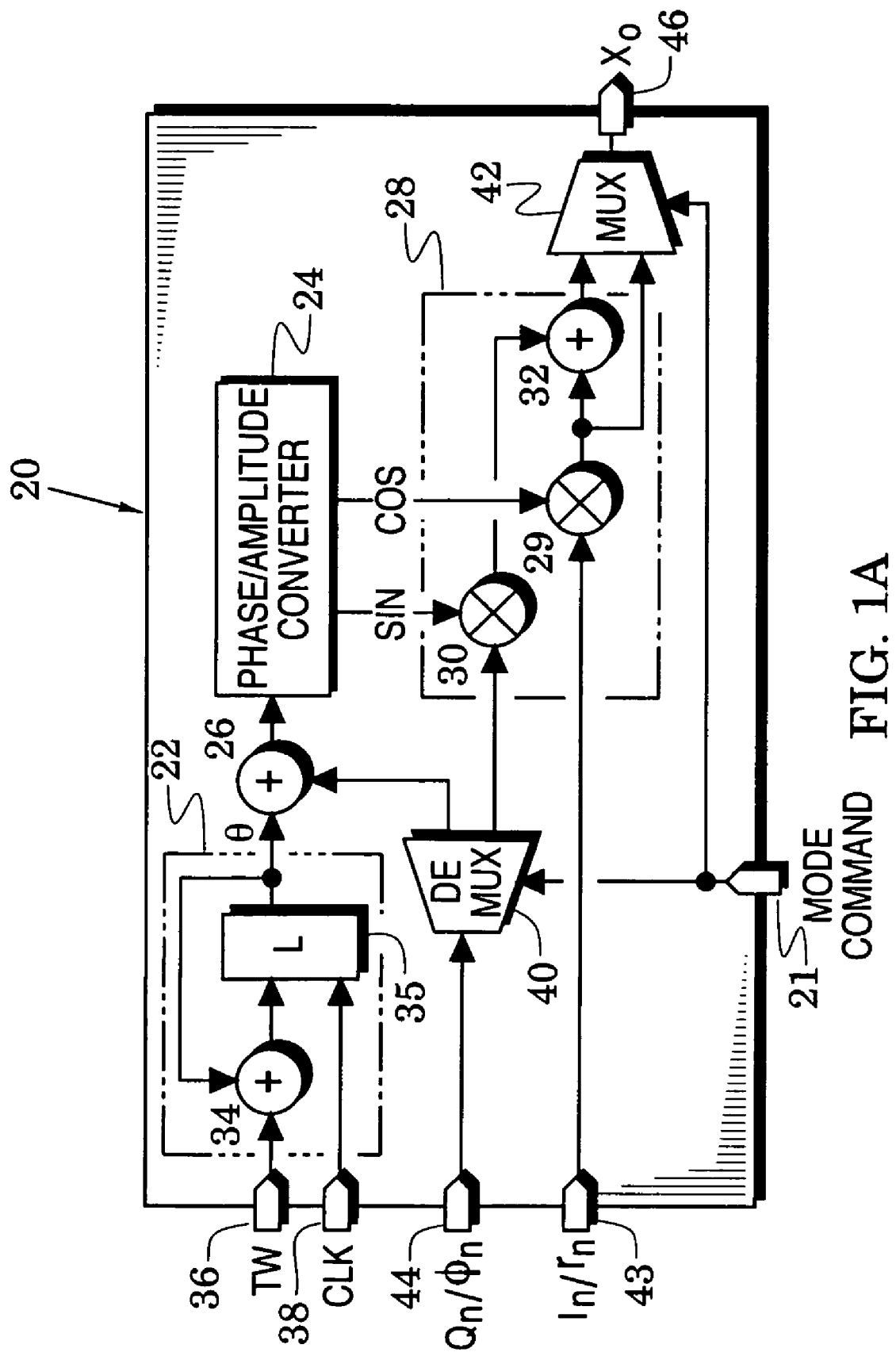
FIGS. 1A–1C are block diagrams of a signal modulator embodiment of the present invention.
Figures 1D, 3:
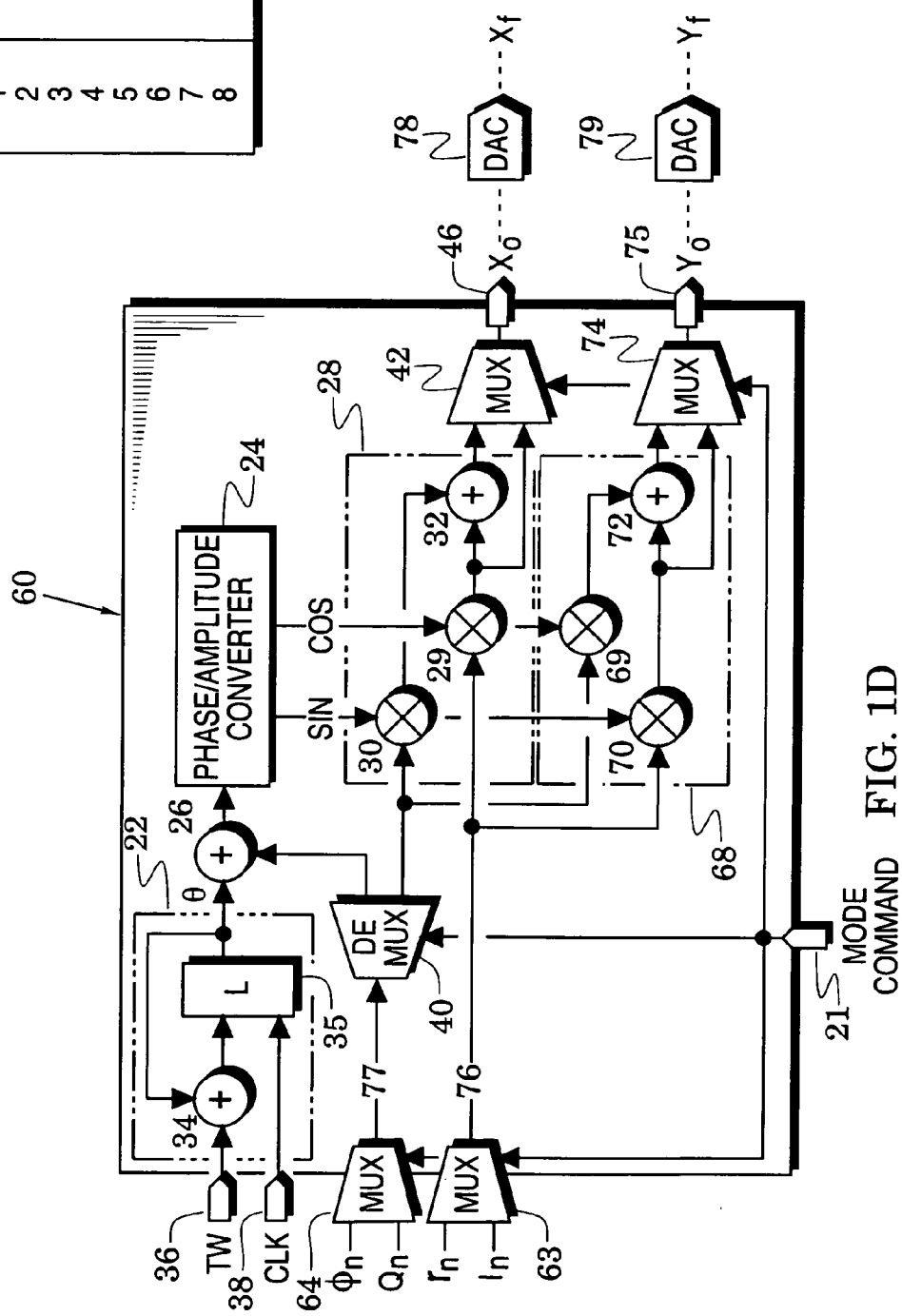
FIG. 1D is a block diagram of another signal modulator embodiment.
FIG. 3 is a table of interchange and negate operations in the signal modulator of FIGS. 2A–2C.

These signal modulator embodiments are particularly useful for selectively generating polar-modulated digital sequences $X_o$ and $Y_o$ from input phase and amplitude symbols $\phi_n$ and $r_n$ and for generating quadrature-modulated digital sequences $X_o$ and $Y_o$ from input first and second quadrature symbols $I_n$ and $Q_n$. In a significant feature of the invention, the modulation structure (quadrature modulation or polar modulation) of these embodiments can selected by simply changing the state of a mode command. As shown in FIG. 1D, associated digital-to-analog converters can subsequently convert these digital sequences to polar-modulated and quadrature-modulated analog signals Directing attention now to these processes, it is noted that FIG. 1A illustrates a signal modulator embodiment 20 of the present invention that can selectively generate polar-modulated sequences and quadrature-modulated sequences as selected by different states of a mode command that is applied at a mode port 21. The modulator includes an accumulator 22, a phase-to-amplitude converter 24, a first summer 26 and a quadrature modulator 28 that is formed with first and second multipliers 29 and 30 which are coupled to a second summer 32.

The accumulator 22 includes a summer 34 and a latch 35. The summer 34 receives a tuning word from an input port 36 and the latch 35 receives words from the summer, is clocked by a clock signal from a clock port 38, and feeds its latch output back as another input to the summer 34. At the clock's sample rate, therefore, the accumulator provides a repeating phase sequence to the first summer 26. This repeating phase sequence repeats at a rate determined by the number of bits processed by the accumulator, by the clock sample rate, and by the amplitude of the tuning word.

The phase-to-amplitude converter 24 is structured (e.g., with a lookup table) to convert the repeating phase sequence to sine and cosine sequences (shown as SIN and COS in FIG. 1A) that represent analog sine and cosine signals. In order to simplify the phase-to-amplitude converter, the word length generated by the accumulator 22 may be truncated to a word length which is represented by $\theta$ in FIG. 1A (the truncation operation is not specifically shown).

In an important feature of the embodiment 20, the quadrature modulator 28 is coupled between an input demultiplexer (DEMUX) 40 and an output multiplexer (MUX) 42 that both respond to the mode command at the mode port 21. The demultiplexer has an input coupled to the symbol input port 44 and has two outputs coupled respectively to the first summer 26 and the second multiplier 30. The multiplexer 42 has two inputs respectively coupled to the first multiplier 29 and the second summer 32 and has an output coupled to a modulator output port 46.

Figure 1B:
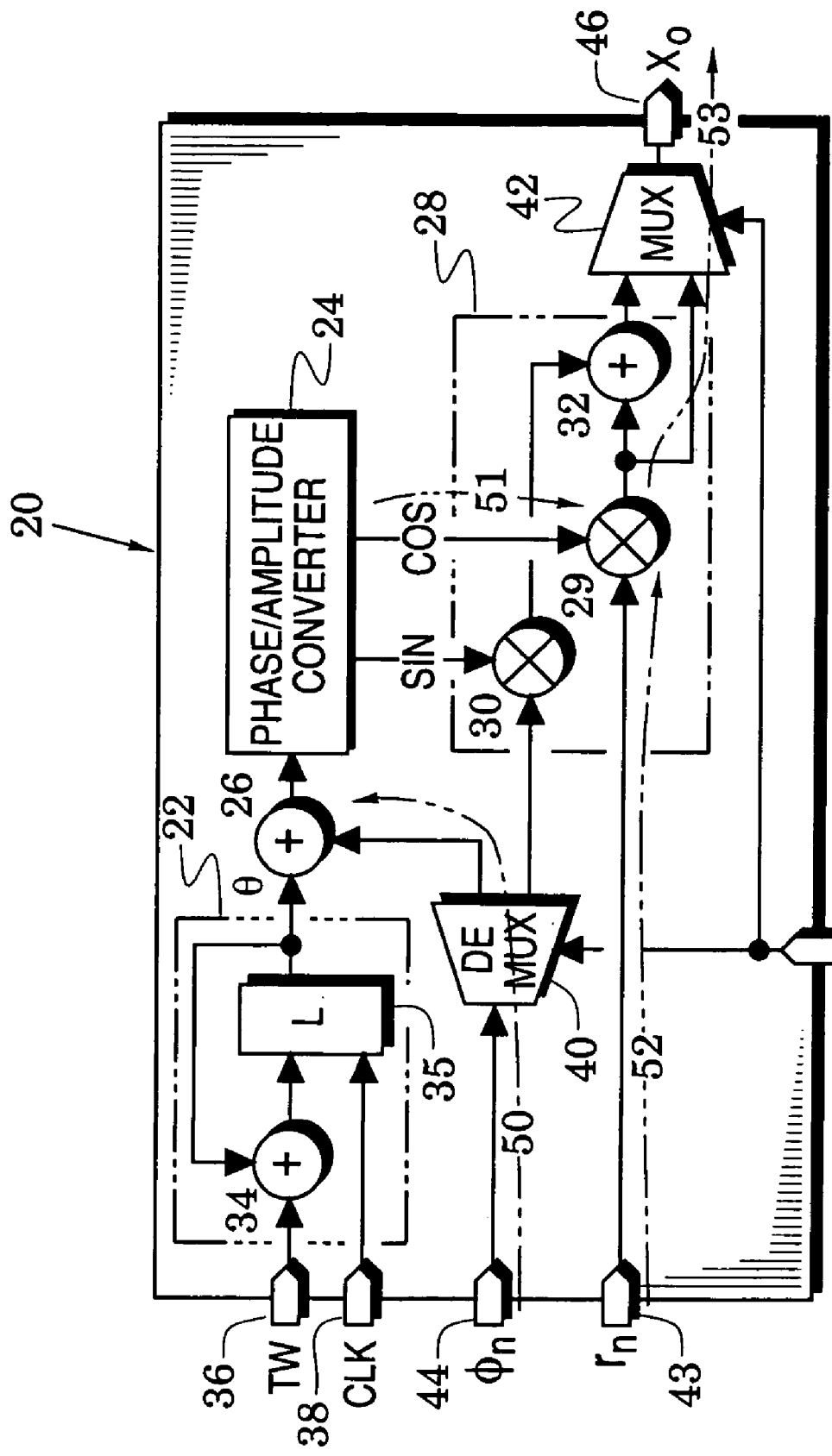

Polar-modulated operation of the modulator embodiment 20 is illustrated in FIG. 1B which includes the structures of FIG. 1A with like elements indicated by like reference numbers. In this figure, a first state of the mode command has commanded the demultiplexer 40 to route input phase symbols $\phi_n$ (received at symbol input port 44) along a signal path 50 to the first summer 26 where the phase symbols $\phi_n$ are added to thereby alter the phase of the repeating digital sequence $\theta$ that was generated by the accumulator 22. This altered phase causes a corresponding phase modulation of the cosine sequence which exits the phase-to-amplitude converter 24.

The altered-phase cosine sequence is sent along a signal path 51 to the first multiplier 29 where it is multiplied in the first multiplier 29 by input amplitude symbols $r_n$ that have been received over a signal path 52 from the symbol input port 43. The amplitude symbols $r_n$ thus multiply the phase-modulated cosine sequence. This multiplication produces a polar-modulated sequence $X_o$ at the output of the first multiplier 29. Finally, the first state of the mode command has also commanded the multiplexer 40 to route the polar-modulated sequence $X_o$ along a signal path 53 to the output port 46.

It is noted that, in another modulator embodiment, the sine and cosine sequences from the phase-to-amplitude converter 24 could be interchanged. In this embodiment, the polar-modulated sequence $X_o$ would be generated with the sine sequence rather than with the cosine sequence as shown in FIG. 1B.

Figure 1C:
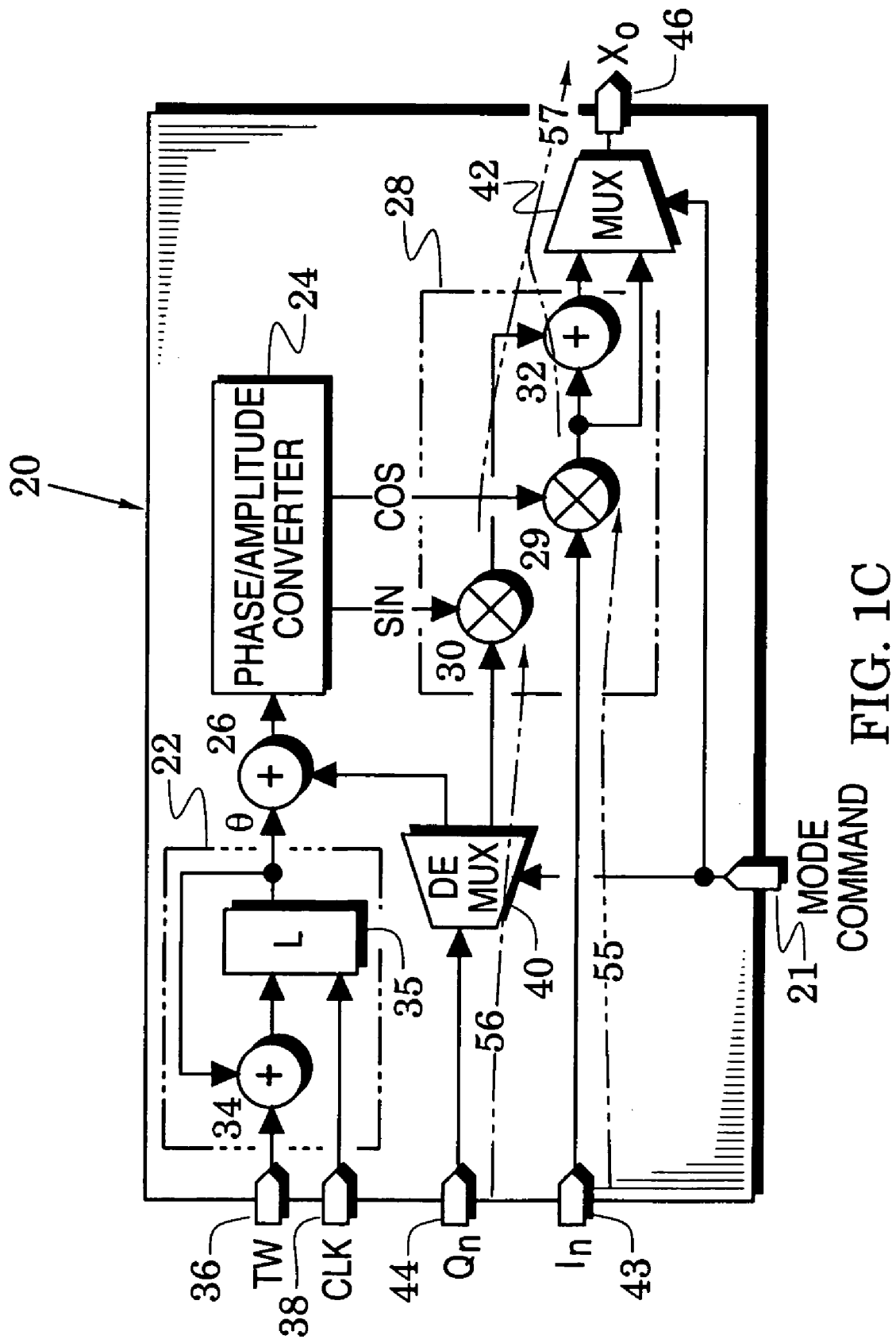

Quadrature-modulated operation of the modulator embodiment 20 is illustrated in FIG. 1C which also includes the structures of FIG. 1A with like elements indicated by like reference numbers. In this figure, first input quadrature symbols In (received at symbol input port 43) pass along a signal path 55 to the first multiplier 29. A second state of the mode command at the mode port 21 has commanded the demultiplexer 40 to route second input quadrature symbols $Q_n$ (received at symbol input port 44) along a signal path 56 to the second multiplier 30.

The first and second quadrature symbols $I_n$ and $Q_n$ respectively multiply the cosine and sine sequences (from the phase-to-amplitude converter 24) and the product sequences are then differenced in summer 32 to produce a quadrature-modulated sequence $I_n \cos \theta - Q_n \sin \theta$. The second state of the mode command commands the multiplexer 42 to route this sequence along a signal path 57 to the output port 46 where it appears as the quadrature-modulated sequence $X_o$.

FIG. 1D illustrates another signal modulator embodiment 60 which includes the structures of FIG. 1A with like elements indicated by like reference numbers. In contrast, however, the modulator 60 replaces the input ports 43 and 44 of FIG. 1A with multiplexers 63 and 64 that each respond to the mode command at the command port 21.

The modulator 60 also has a second quadrature modulator 68 that is formed with third and fourth multipliers 69 and 70 and a third summer 72. A second multiplexer 74 has been added and it has two inputs respectively coupled to the fourth multiplier 70 and the third summer 72 and has an output coupled to a additional modulator output port 75.

In response to the first state of the mode command (at mode port 21), the multiplexers 63 and 64 route input amplitude symbols $r_n$ and input phase symbols $\phi_n$ onto the signal paths 76 and 77. In response to the second state of the mode command, the multiplexers 63 and 64 route first input quadrature symbols $I_n$ and second input quadrature symbols $Q_n$ onto the signal paths 76 and 77. Thus, all input symbols may be present at the multiplexer inputs and the multiplexers 63 and 64 make them available for modulation as directed by the mode command.

The second quadrature modulator 68 operates similarly to the first quadrature modulator 28 except that the summer 72 adds whereas the summer 32 differences. When the mode command (at mode port 21) is in its first state, the input amplitude symbols $r_n$ and input phase symbols $\phi_n$ are routed onto the signal paths 76 and 77, the demultiplexer 40 routes the input phase symbols $\phi_n$ to the first summer 26, and the multiplexers 74 and 42 route the output sequences of the first and fourth multipliers 29 and 70 to the output ports 46 and 75. Thus, polar-modulated sequences $$X_o(n) = r_n \cos(\theta'_n) \ Y_o(n) = r_n \sin(\theta'_n)$$

are respectively provided at the output ports 46 and 75 wherein $\theta'_n$ is the altered phase provided by the first summer 26 and $\theta'_n = \theta_n + \phi_n$.

When the mode command is in its second state, the input first and second input quadrature symbols $I_n$ and $Q_n$ are routed onto the signal paths 76 and 77, the demultiplexer 40 routes the second input quadrature symbols $Q_n$ to the second multiplier 30, and the multiplexers 74 and 42 route the output sequences of the first and second quadrature modulators 28 and 68 to the output ports 46 and 75. Quadrature-modulated sequences $X_o = I_n \cos \theta - Q_n \sin \theta$ and $Y_o = I_n \sin \theta + Q_n \cos \theta$ are accordingly provided at the output ports 46 and 75.

Finally, the embodiment 60 also provides first and second digital-to-analog converters (DACs) 78 and 79 which respectively convert the output sequences $X_o$ and $Y_o$ into first and second analog signals $X_f$ and $Y_f$.

Figure 2A:
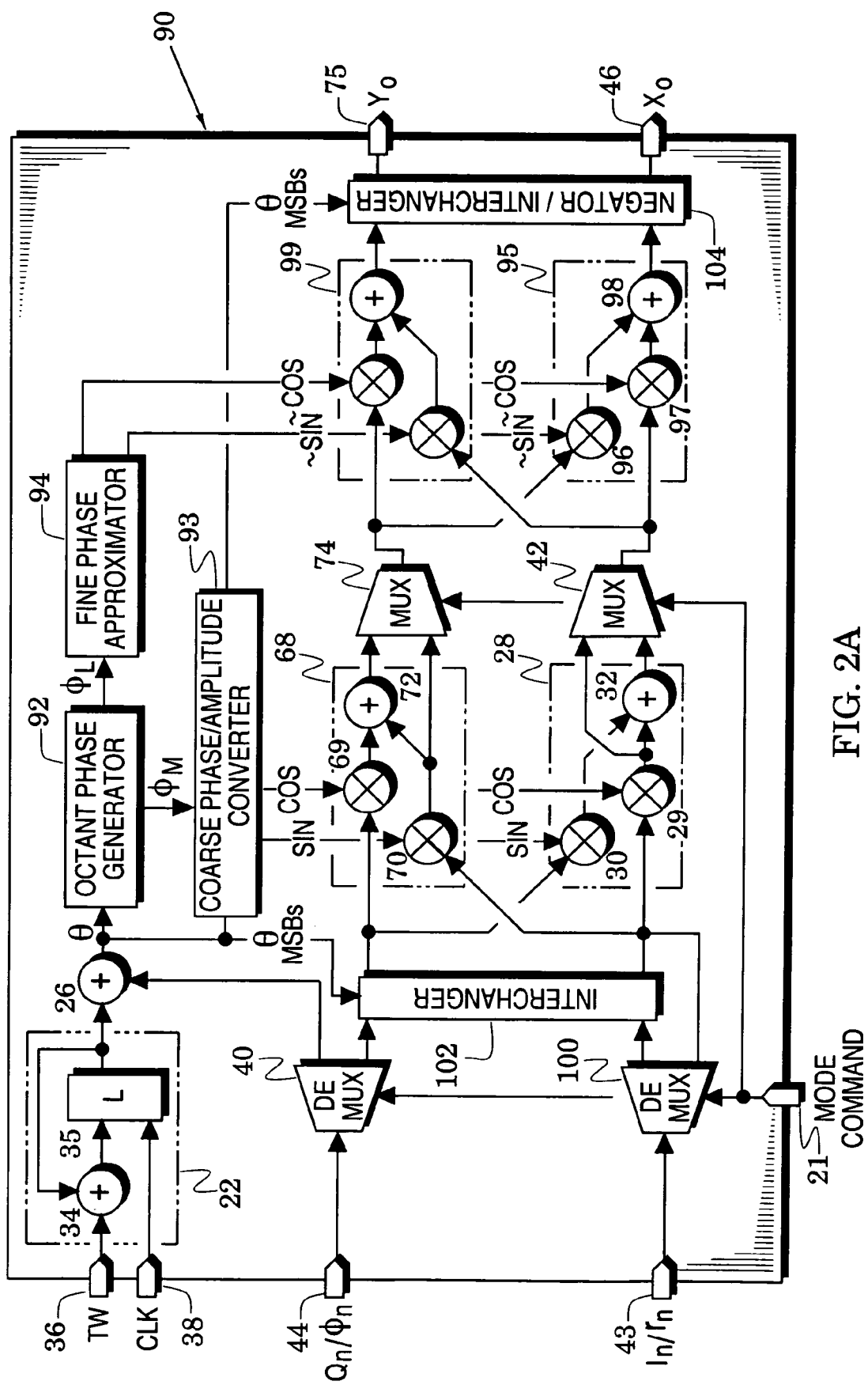
FIGS. 2A–2C are block diagrams of another signal modulator embodiment.

FIG. 2A illustrates another universal signal modulator embodiment 90 which includes the structures of the signal modulator 60 of FIG. 1D with like elements indicated by like reference numbers. In FIG. 2A, however, the multiplexers 63 and 64 of FIG. 1D have been replaced by the ports 43 and 44 of FIG. 1A and the physical location of quadrature modulators 28 and 68 have been interchanged to simplify the flow of signals through the figure.

The modulator 90 replaces the phase-to-amplitude converter 24 of FIG. 1A with a coarse phase-to-amplitude converter 93 and inserts an octant phase generator 92 between the converter 93 and the first summer 26. The sine and cosine sequences of the first and second quadrature modulators 28 and 68 are provided by the coarse phase-to-amplitude converter 93. A fine phase approximator 94 is inserted to respond to the octant phase generator and provide approximate sine and cosine sequences which are indicated in FIG. 2A as ~sin and ~cos.

The demultiplexer 40 has been supplemented with another demultiplexer 100 and an interchanger 102 has been inserted between these demultiplexers and the first and second quadrature modulators 28 and 68. The input of the added demultiplexer 100 is coupled to the symbol input port 43 and its outputs are coupled to the interchanger 102 and to the second and fourth summers 29 and 70.

In addition, digital sequences from the multiplexers 42 and 74 are now coupled to first and second fine quadrature modulators 95 and 99. As exemplified by the modulator 95, they are formed with multipliers 96 and 97 which are coupled to a summer 98. Signals from each of the multiplexers 42 and 74 are coupled as inputs to each of the fine quadrature modulators 95 and 99. Finally, a negator/interchanger 104 has been inserted between the fine quadrature modulators 95 and 99 and the output ports 46 and 75.

As previously stated, the accumulator 22 generates a repeating phase sequence of digital words that are typically truncated to a word length which is represented by the sequence $\theta$ in FIG. 2A. In the modulator 90, the interchanger 102 and the negator/interchanger 104 are configured to only respond to the three most-significant bits of the sequence $\theta$. This 3-bit sequence is shown as "$\theta$ MSBs" in FIG. 2A. For the interchanger 102 and the negator/interchanger 104, this 3-bit sequence identifies which octant of the repeating phase sequence $\theta$ is currently being supplied by the accumulator 22.

The octant phase generator 92 is configured to remove the two most-significant bits from the repeating phase sequence $\theta$ to provide a repeating octant phase sequence $\phi$ which is restricted to octants of the phase sequence $\theta$. The octant phase generator 92 divides this octant sequence into a coarse octant phase sequence $\phi_M$ that contains the most-significant bits of the phase sequence $\phi$ and a fine octant phase sequence $\phi_L$ that contains the least-significant bits. The dividing point is between the most-significant bits and the least-significant bits is selected to realize a precision which has been predetermined.

Because the coarse octant phase sequence $\phi_M$ is substantially shortened relative to the repeating phase sequence $\theta$, the multipliers and summers of the first and second quadrature modulators 28 and 68 are substantially simplified from their structure in the modulator 60 of FIG. 1D. In addition, the structure (e.g., a lookup table) of the fine phase-to-amplitude converter 93 is substantially simplified relative to that of the phase-to-amplitude converter 24 of FIG. 1D.

The signal modulator 90 also includes a fine phase approximator 94 which receives the fine octant phase sequence $\phi_L$ and, in response, provides approximate sine and cosine sequences ~sin and ~cos. It has been shown that these approximate sequences need not require the determination of sine and cosine values to realize the predetermined precision. Rather, the fine phase approximator 94 generates the approximate sine sequence ~sin by simply calculating the fine octant phase sequence $(\pi/4)\phi_L$ and generates the approximate cosine sequence ~cos by simply calculating $1-(\frac{1}{2})((\pi/4)\phi_L)^2$. Because the fine phase approximator 94 performs these simple multiplications and does not have to supply sine and cosine values, its structure is also substantially simplified.

In operation of the signal modulator 90, the first state of the mode command (at mode port 21) causes the demultiplexer 40 to route the input phase symbols $\phi_n$ to the first summer 26 and causes the demultiplexer 100 to route the input amplitude symbols $r_n$ to the first and fourth multipliers 29 and 70. The first state also causes the multiplexers 42 and 74 to route the output sequences of multipliers 29 and 70 directly to the first and second fine quadrature modulators 95 and 99. Angle modulation is thus processed in the first summer 26 and amplitude modulation is processed in the first and fourth multipliers 29 and 70. Final fine amplitude modulation is processed in the first and second fine quadrature modulators 95 and 99. The completed polar-modulated sequences $X_o$ and $Y_o$ are provided at the output ports 46 and 75.

In contrast, the second state of the mode command causes the demultiplexers 40 and 100 to route the input first and second quadrature symbols $I_n$ and $Q_n$ to the interchanger 102 and causes the multiplexers 42 and 74 to route the output sequences of the first and second coarse quadrature modulators 28 and 68 respectively to the first and second fine quadrature modulators 95 and 99. Coarse quadrature modulation is processed in the first and second coarse quadrature modulators 28 and 68 and fine quadrature modulation is processed in the first and second fine quadrature modulators 95 and 99. The completed quadrature-modulated sequences $X_o$ and $Y_o$ are provided at the output ports 46 and 75.

As previously stated, the octant phase generator 92 only provides octant phase sequences to the coarse phase-to-amplitude converter 93 and the phase approximator 94. This significantly simplifies the multipliers and summers in the quadrature modulators 28, 68, 95 and 99 and significantly simplifies the coarse phase-to-amplitude converter 93. However, the information of the sine and cosine sequences of the coarse phase-to-amplitude converter 93 and of the approximate sine and cosine sequences of the phase approximator 94 can only be directly used when the repeating phase sequence $\theta$ is in its first octant. This information can also be used in quadrants two through eight but must be modified in accordance with the particular shapes of sine and cosine waveforms.

This modification is performed by the interchanger 102 and the negator/interchanger 104 and proceeds as shown in the table 110 of FIG. 3. As noted above, no modification is needed in the first octant. The interchanger 102 must be configured, however, to interchange the first and second quadrature symbols $I_n$ and $Q_n$ when repeating phase sequence $\theta$ is in quadrants 2, 4, 6 and 8 as indicated by x's in the quadrant column of FIG. 3.

Similarly, the negator/interchanger 104 of FIG. 2A must be configured to interchange the quadrature-modulated sequences $X_o$ and $Y_o$ when the repeating phase sequence $\theta$ is in quadrants 3, 4, 7 and 8. It must negate (i.e., change sign) the quadrature-modulated sequence $X_o$ when the repeating phase sequence $\theta$ is in quadrants 2, 4, 5 and 7, and negate (i.e., change sign) the quadrature-modulated sequence $Y_o$ when the repeating phase sequence $\theta$ is in quadrants 3, 4, 5 and 6.

Figure 2B:
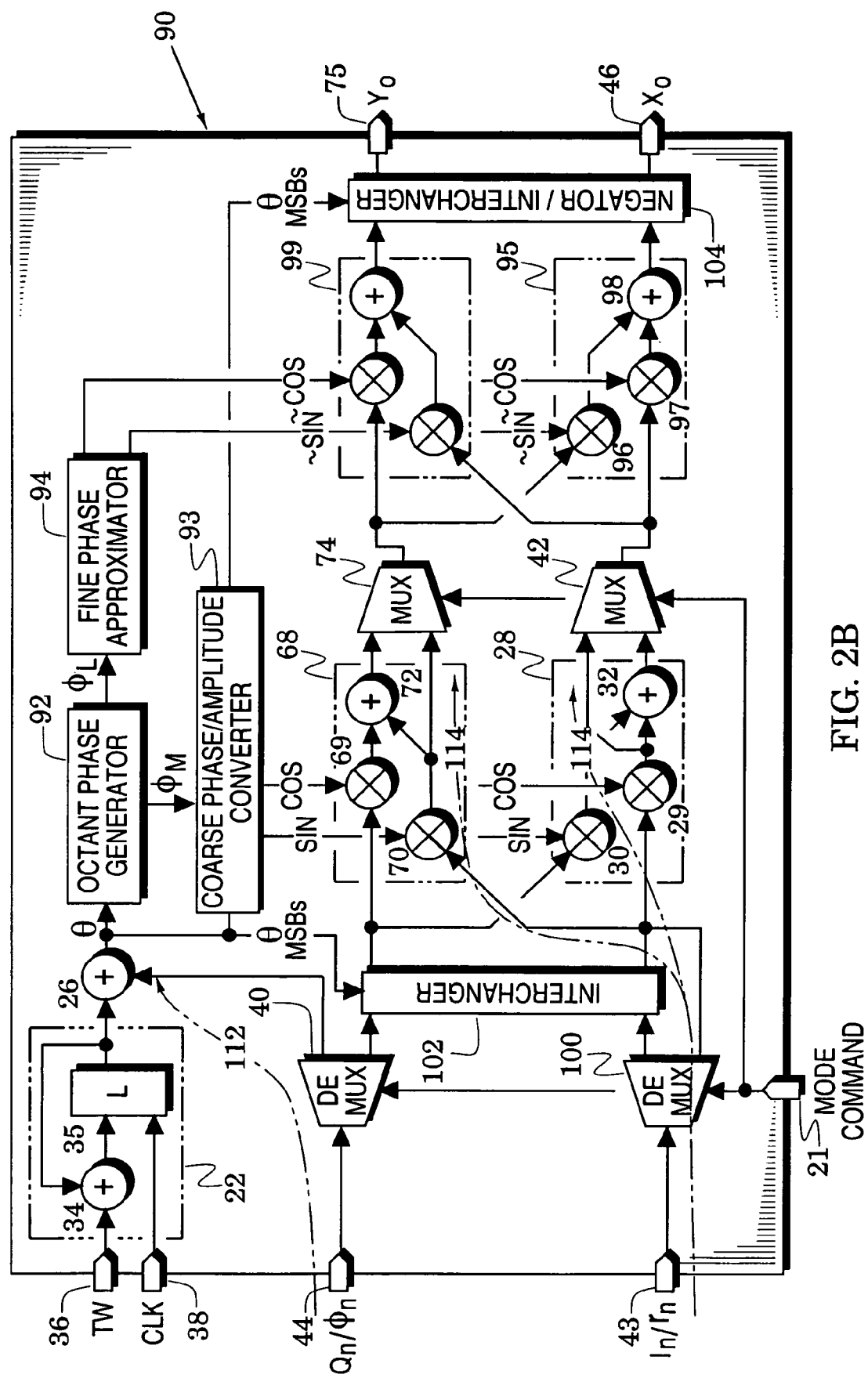

Polar-modulated operation of the modulator embodiment 90 is further illustrated in FIG. 2B which includes the structures of FIG. 2A with like elements indicated by like reference numbers. In this figure, the phase symbols $\phi_n$ are processed along a signal path 112 that passes through the second demultiplexer 40 and the first summer 26. The amplitude symbols $r_n$ are processed along signal paths 114 that pass through the first demultiplexer 100 and the first and fourth multipliers 29 and 70.

Figure 2C:
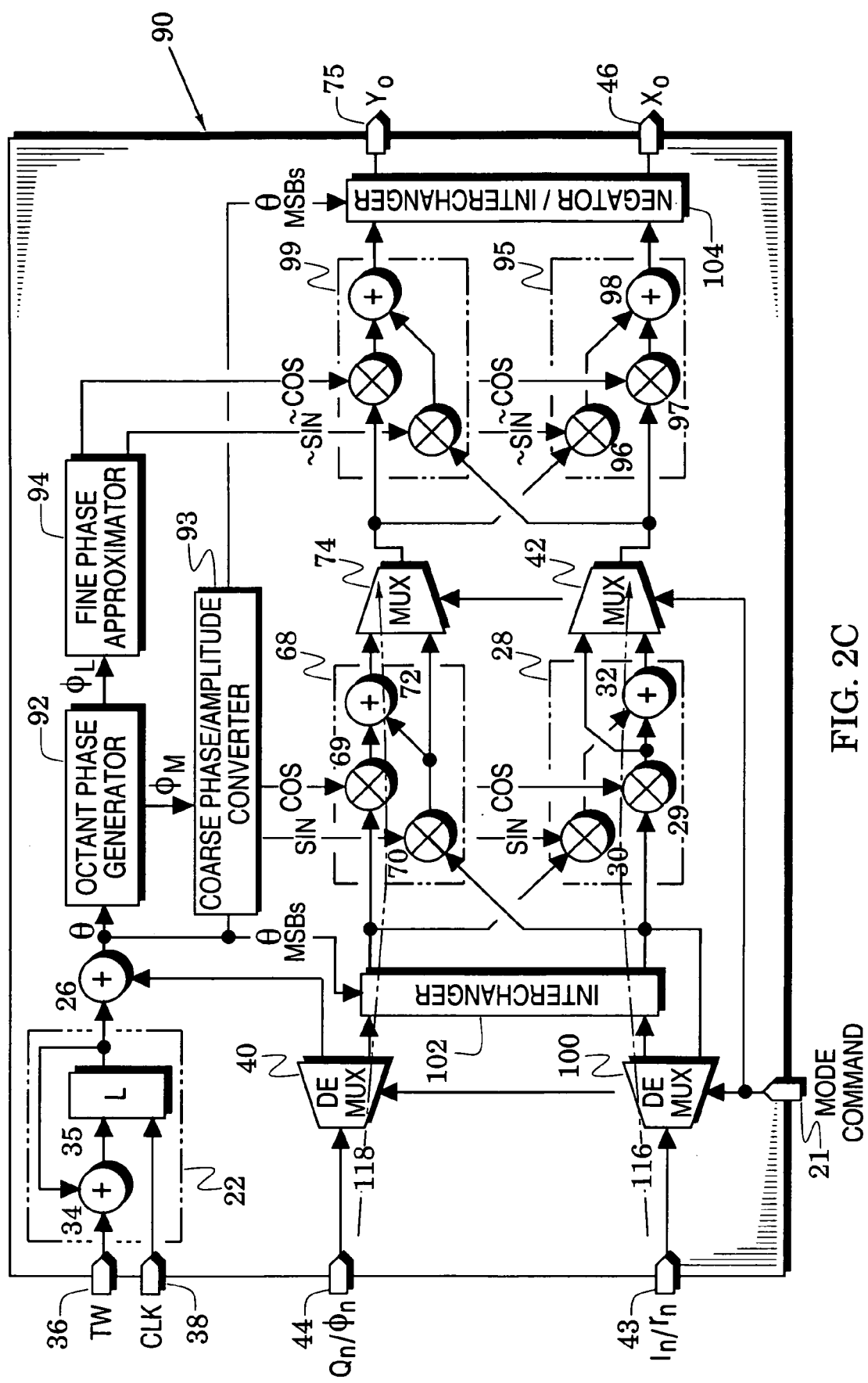

Quadrature-modulated operation of the modulator embodiment 90 is further illustrated in FIG. 2C which includes the structures of FIG. 2A with like elements indicated by like reference numbers. In this figure, the first quadrature symbols $I_n$ are processed along a signal path 116 that passes through the second demultiplexer 100, the interchanger 102 and the first quadrature modulator 28. The second quadrature symbols $Q_n$ are processed along a signal path 118 that passes through the first demultiplexer 40, the interchanger 102 and the second quadrature modulator 68. The signals of the paths 116 and 118 then respectively continue through the fine quadrature modulators 95 and 99 and the negator/interchanger 104.

In applications of the universal signal modulator embodiments of the invention, it is noted that multiple bits of input data streams may be initially mapped in accordance with modulation constellations to thereby generate the input phase symbols $\phi_n$ and amplitude symbols $r_n$ as well as the input first and second quadrature symbols $I_n$ and $Q_n$. It is further noted that the resultant symbols may be shaped through digital shaping filters to reduce intersymbol interference and have their sample rates altered through interpolation filters so that they match the sample rates of subsequent modulation operations. Such mapping, shaping and interpolating operations would generally be accomplished prior to the modulating operations performed by modulator embodiments of the invention.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A signal modulator that selectively generates a polar-modulated sequence and a quadrature-modulated sequence, comprising:

an accumulator that provides a repeating phase sequence in response to a tuning word and a clock signal;

a phase-to-amplitude converter that converts said repeating phase sequence to a sine sequence and a cosine sequence;

a first summer inserted between said accumulator and said converter to selectively alter the phase of said repeating digital sequence in response to input phase symbols;

a first multiplier coupled to provide a first multiplied sequence in response to first input quadrature symbols and a selected sequence of said sine sequence and said cosine sequence and further coupled to respond with said first summer and provide said polar-modulated sequence in response to input amplitude symbols and said selected sequence; and a second multiplier coupled to provide a second multiplied sequence in response to second quadrature symbols and the other sequence of said sine sequence and said cosine sequence; and a second summer coupled to provide said quadrature-modulated sequence in response to said first and second multiplied sequences.

2. The modulator of claim 1, further including;

a demultiplexer that routes said phase symbol to said first summer in response to a first state of a mode command and routes said second quadrature symbol to said second multiplier in response to a second state of said mode command; and a multiplexer that routes said polar-modulated sequence to a modulator output in response to said first state and routes said quadrature-modulated sequence to said modulator output in response to said second state.

3. The modulator of claim 1, further including a digital-to-analog converter coupled to convert said polar-modulated sequence to a polar-modulated analog signal and to convert said quadrature-modulated sequence to a quadrature-modulated analog signal.

4. The modulator of claim 1, further including;

a third multiplier coupled to provide a third multiplied sequence in response to said first input quadrature symbols and said other sequence and further coupled to respond with said first summer and provide a second polar-modulated sequence in response to said input amplitude symbols and said other sequence;

a fourth multiplier coupled to provide a fourth multiplied sequence in response to said second quadrature symbols and said selected sequence; and a third summer coupled to provide a second quadrature-modulated sequence in response to said third and fourth multiplied sequences.

5. The modulator of claim 4, further including;

a demultiplexer that routes said phase symbol to said first summer in response to a first state of a mode command and routes said second quadrature symbol to said second and fourth multipliers in response to a second state of said mode command;

a first multiplexer that routes said polar-modulated sequence to a first modulator output in response to said first state and routes said quadrature-modulated sequence to said first modulator output in response to said second state; and a second multiplexer that routes said second polar-modulated sequence to a second modulator output in response to said first state and routes said second quadrature-modulated sequence to said second modulator output in response to said second state.

6. The modulator of claim 4, further including:

a first digital-to-analog converter coupled to convert said polar-modulated sequence to a polar-modulated analog signal and to convert said quadrature-modulated sequence to a quadrature-modulated analog signal; and a second digital-to-analog converter coupled to convert said second polar-modulated sequence to a second polar-modulated analog signal and to convert said second quadrature-modulated sequence to a second quadrature-modulated analog signal.

7. The modulator of claim 1, further including:

a digital-to-analog converter coupled to convert said polar-modulated sequence to a polar-modulated analog signal and to convert said quadrature-modulated sequence to a quadrature-modulated analog signal; and a second digital-to-analog converter coupled to convert said second polar-modulated sequence to a second polar-modulated analog signal and to convert said second quadrature-modulated sequence to a second quadrature-modulated analog signal.

8. A signal modulator that selectively generates polar-modulated sequences and quadrature-modulated sequences, comprising:

an accumulator that provides a repeating phase sequence in response to a tuning word and a clock signal;

an octant phase generator that reduces said repeating phase sequence to a repeating coarse octant phase sequence and a repeating fine octant phase sequence;

a coarse phase-to-amplitude converter that converts said coarse octant phase sequence to a coarse octant sine sequence and a coarse octant cosine sequence;

a summer inserted between said accumulator and said octant phase generator to selectively alter the phase of said repeating digital sequence in response to input phase symbols;

an interchanger that passes and interchanges said first and second input quadrature symbols in selective responses to at least a portion of said repeating phase sequence;

first and second quadrature modulators coupled to provide first and second coarse quadrature-modulated sequences in response to first and second input quadrature symbols from said interchanger and to said coarse octant sine sequence and said coarse octant cosine sequence;

first and second multipliers in respectively said first and second quadrature modulators that are coupled to provide first and second coarse polar-modulated sequences in response to input amplitude symbols and to said coarse octant sine sequence and said coarse octant cosine sequence a fine phase approximator coupled to provide approximate-sine and approximate-cosine sequences in response to said repeating fine octant phase sequence;

a third quadrature modulator coupled to modulate sequences from said first quadrature modulator and said first multiplier with said approximate-cosine sequence and modulate sequences from said second quadrature modulator and said second multiplier with said approximate-sine sequence;

a fourth quadrature modulator coupled to modulate sequences from said first quadrature modulator and said first multiplier with said approximate-sine sequence and modulate sequences from said second quadrature modulator and said second multiplier with said approximate-cosine sequence; and a negator/interchanger that passes, negates and interchanges sequences from said third and fourth quadrature modulators in selective response to at least a portion of said repeating phase sequence to thereby convert said first and second coarse polar-modulated sequences to said polar-modulated sequences and convert said first and second coarse quadrature-modulated sequences to said quadrature-modulated sequences.

9. The modulator of claim 8, further including:
a first demultiplexer that routes said phase symbols to said summer in response to a first state of a mode command and routes said second quadrature symbols to said interchanger in response to a second state of said mode command;
a second demultiplexer that routes said amplitude symbols to said first and second multipliers in response to said first state and routes said second quadrature symbol to said interchanger in response to said second state;
a first multiplexer that routes sequences from said first multiplier to said third quadrature modulator in response to said first state and routes sequences from said first quadrature modulator to said third quadrature modulator in response to said second state; and
a second multiplexer that routes sequences from said second multiplier to said fourth quadrature modulator in response to said first state and routes sequences from said second quadrature modulator to said fourth quadrature modulator in response to said second state.

10. The modulator of claim 8, further including at least one digital-to-analog converter coupled to convert said polar-modulated sequences to polar-modulated analog signals and to convert said quadrature-modulated sequences to quadrature-modulated analog signals.

11. A signal modulator that selectively generates polar-modulated sequences and quadrature-modulated sequences, comprising:
an accumulator that provides a repeating phase sequence in response to a tuning word and a clock signal;
an octant phase generator that reduces said repeating phase sequence to a repeating coarse octant phase sequence and a repeating fine octant phase sequence;
a coarse phase-to-amplitude converter that converts said coarse octant phase sequence to a coarse octant sine sequence and a coarse octant cosine sequence;
a summer inserted between said accumulator and said octant phase generator to selectively alter the phase of said repeating digital sequence in response to input phase symbols;
a fine phase approximator coupled to provide approximate-sine and approximate-cosine sequences in response to said repeating fine octant phase sequence;
an interchanger;
first and second quadrature modulators that receive said coarse octant sine sequence and said coarse octant cosine sequence;
first and second multipliers respectively positioned in said first and second quadrature modulators;
a first demultiplexer that routes amplitude symbols to said first and second multipliers in response to a first state of a mode command and routes first quadrature symbols to said interchanger in response to a second state of said mode command;
a second demultiplexer that routes phase symbols to said summer in response to said first state and routes second quadrature symbols to said interchanger in response to said second state wherein said interchanger passes and interchanges said first and second quadrature symbols in selective responses to at least a portion of said repeating phase sequence;
third and fourth quadrature modulators that receive said approximate-sine and said approximate-cosine sequences;
a first multiplexer that routes sequences from said first multiplier to said third and fourth quadrature modulators in response to said first state and routes sequences from said first quadrature modulator to said third and fourth quadrature modulators in response to said second state;
a second multiplexer that routes sequences from said second multiplier to said third and fourth quadrature modulators in response to said first state and routes sequences from said second quadrature modulator to said third and fourth quadrature modulators in response to said second state; and
a negator/interchanger that passes, negates and interchanges sequences from said third and fourth quadrature modulators in selective response to at least a portion of said repeating phase sequence to thereby provide polar-modulated sequences in said first state and quadrature-modulated sequences in said second state.

12. The modulator of claim 11, further including:
a third multiplier in said first quadrature modulator; and
a second summer in said first quadrature modulator that is coupled to said first and third multipliers;
a fourth multiplier in said second quadrature modulator; and
a third summer in said second quadrature modulator that is coupled to said second and fourth multipliers.

13. The modulator of claim 11, further including at least one digital-to-analog converter coupled to convert said polar-modulated sequences to polar-modulated analog signals and to convert said quadrature-modulated sequences to quadrature-modulated analog signals.

* * * * *